United States Patent
Falk et al.

(10) Patent No.: US 11,657,183 B2
(45) Date of Patent: May 23, 2023

(54) METHOD FOR PROVIDING RESTRICTED ACCESS TO HARDWARE COMPONENT INTERFACES OF A NETWORK DEVICE

(71) Applicant: Siemens Aktiengesellschaft, Munich (DE)

(72) Inventors: Rainer Falk, Poing (DE); Christian Peter Feist, München (DE); Johannes Zwanzger, Neubiberg (DE)

(73) Assignee: SIEMENS AKTIENGESELLSCHAFT

( * ) Notice: Subject to any disclaimer, the term of this patent is extended or adjusted under 35 U.S.C. 154(b) by 233 days.

(21) Appl. No.: 16/758,062

(22) PCT Filed: Oct. 18, 2018

(86) PCT No.: PCT/EP2018/078479
§ 371 (c)(1),
(2) Date: Apr. 22, 2020

(87) PCT Pub. No.: WO2019/091738
PCT Pub. Date: May 16, 2019

(65) Prior Publication Data
US 2021/0192083 A1 Jun. 24, 2021

(30) Foreign Application Priority Data
Nov. 8, 2017 (EP) .................... 17200614

(51) Int. Cl.
*H04L 9/40* (2022.01)
*G06F 21/62* (2013.01)

(52) U.S. Cl.
CPC ........ *G06F 21/6281* (2013.01); *H04L 63/105* (2013.01); *G06F 2221/2141* (2013.01); *H04L 63/02* (2013.01)

(58) Field of Classification Search
CPC ......... G06F 21/6281; G06F 2221/2141; H04L 63/105; H04L 63/104; H04L 63/02
See application file for complete search history.

(56) References Cited

U.S. PATENT DOCUMENTS

2001/0023449 A1   9/2001   Clark et al.
2009/0271844 A1*  10/2009  Zhang ................ G06F 12/1458
                                                          726/2

(Continued)

FOREIGN PATENT DOCUMENTS

CN     101997912 A     3/2011
CN     105245543 A     1/2016

OTHER PUBLICATIONS

Smalley S: "Configuring the SELinux Policy", Internet Citation, 2003, XP002388034, retrieved from the Internet: URL:http://web.archive.org/web/20040719194253/www.nsa.gov/selinux/papers/policy2.pdf, [retrieved on Jun. 29, 2006], section 2, section 3.1, tables 2-5, section 4.6.2, section 4.6.4, section 5.1, section 7.3, section 7.5.

(Continued)

*Primary Examiner* — Brian F Shaw
(74) *Attorney, Agent, or Firm* — Schmeiser, Olsen & Watts LLP

(57) ABSTRACT

A method for providing restricted access to hardware component interfaces of a network device by one or more software components of the network device, wherein an access to a hardware component interface requested by a software component is permitted by a mandatory access control, MAC, mechanism implemented as part of the network device's operating system on the basis of a MAC security policy including access rights defined as access relations between software component security labels assigned to software component types and hardware com- (Continued)

ponent interface security labels assigned to hardware component interface types.

14 Claims, 4 Drawing Sheets

(56) References Cited

U.S. PATENT DOCUMENTS

2010/0088739 A1* 4/2010 Hall .................. G06F 21/629
711/163
2013/0139244 A1* 5/2013 Blaich ................ G06F 21/629
726/11

OTHER PUBLICATIONS

European Extended Search Report dated May 28, 2018 for Application No. 17200614.0.
International Search Report and Written Opinion for PCT/EP2018/078479 dated Jan. 18, 2019.

* cited by examiner

METHOD FOR PROVIDING RESTRICTED ACCESS TO HARDWARE COMPONENT INTERFACES OF A NETWORK DEVICE

CROSS-REFERENCE TO RELATED APPLICATIONS

This application claims priority to PCT Application No. PCT/EP2018/078479, having a filing date of Oct. 18, 2018, based on European Application No. 17200614.0, having a filing date of Nov. 8, 2017, the entire contents both of which are hereby incorporated by reference.

FIELD OF TECHNOLOGY

The following relates to a method and apparatus for providing restricted access to hardware component interfaces of a network device by one or more software components of the respective network device.

BACKGROUND

In many use cases, it is a requirement that data communication is not influenced in an inadmissible way. For instance, in industrial control networks, data communication between control devices may not be corrupted. In such an industrial control network, only admitted devices are used. External systems which may be used for diagnostic purposes or for preemptive maintenance are not allowed to be directly connected with such a control network. In a conventional system, so-called data diodes or one-way gateways are implemented to transmit data from the control network such that a non-reactive unidirectional dataflow is provided. However, the use of conventional data diode entities does not offer protection if there is a failure or manipulation of a device which is located within the separate control network or which is connected to such a one-way gateway.

SUMMARY

An aspect relates to a method and apparatus to increase security and reliability of components used in the operation of a safety-critical control network.

Embodiments of the invention provides according to a first aspect a method for providing restricted access to hardware component interfaces of a network device by one or more software components of the network device, wherein an access to a hardware component interface requested by a software component is permitted by a mandatory access control mechanism implemented as part of the network device's operating system on the basis of a MAC security policy comprising access rights defined as access relations between software component security labels assigned to software component types and hardware component interface security labels assigned to hardware component interface types.

In a possible embodiment of the method according to the first aspect of embodiments of the present invention, the restricted access to a requested hardware component interface by a requesting software component permitted by the MAC mechanism provides a non-reactive unidirectional dataflow.

In a possible embodiment of the method according to the first aspect of embodiments of the present invention, the access relations indicate access types of access to the hardware component interfaces by the software components permitted according to the access rights of the MAC security policy.

In a still further possible embodiment of the method according to the first aspect of embodiments of the present invention, the access types of the access relations comprise
a read only, RO, access type,
a write only, WO, access type,
a read and write, RW, access type,
a client mode access type, and
a server mode access type.

In a further possible embodiment of the method according to the first aspect of embodiments of the present invention, the software components comprise applications including control applications, real-time control applications, safety applications, device status applications, configuration applications, and data validation applications.

In a further possible embodiment of the method according to the first aspect of embodiments of the present invention, the hardware component interfaces comprise
IO interfaces, network interfaces, memory interfaces and configuration interfaces.

In a still further possible embodiment of the method according to the first aspect of embodiments of the present invention, the hardware component interface types comprise a configuration type, a device intern type, a control network type and an open network type.

In a further possible embodiment of the method according to the first aspect of embodiments of the present invention, the software component types comprise a control network domain, an open network domain, a domain intern domain, a control domain, an external communication domain and a device intern cross domain.

In a still further possible embodiment of the method according to the first aspect of embodiments of the present invention, the MAC security policy is stored in a file system of the network device loaded during booting of the network device's operating system.

In a further possible alternative embodiment of the method according to the first aspect of embodiments of the present invention, the MAC security policy is compiled into the operating system kernel of the device's operating system.

In a still further possible embodiment of the method according to the first aspect of embodiments of the present invention, the operating system comprises a non-real time operating system.

In a still further possible alternative embodiment of the method according to the first aspect of embodiments of the present invention, the operating system comprises a real time operating system.

Embodiments of the invention provides according to the second aspect a network device with restricted access to its hardware component interfaces, the network device comprising
an operating system kernel implemented in a processor of the network device and including a mandatory access control, MAC, mechanism adapted to control access to the hardware component interfaces of the network device by one or more software components of the network device on the basis of a MAC security policy comprising access rights defined as access relations between software component security labels assigned to software component types and hardware component interface security labels assigned to hardware component interface types.

In a possible embodiment of the network device according to the first aspect of embodiments of the present invention, the hardware component interfaces of the network device comprise IO interfaces, network interfaces, memory interfaces and/or configuration interfaces.

In a further possible embodiment of the network device according to the first aspect of embodiments of the present invention, the network interfaces of the network device comprise at least one internal network interface to an internal control network and at least one external network interface to an external network.

In a possible embodiment, the network device according to the first aspect of embodiments of the present invention is a programmable logic controller.

In a further possible embodiment of the network device according to the first aspect of embodiments of the present invention, the network device is a IoT gateway.

In a further possible embodiment of the network device according to the second aspect of embodiments of the present invention, the network device is formed by a control device.

BRIEF DESCRIPTION

Some of the embodiments will be described in detail, with reference to the following figures, wherein like designations denote like members, wherein.

DETAILED DESCRIPTION

Figure 1:
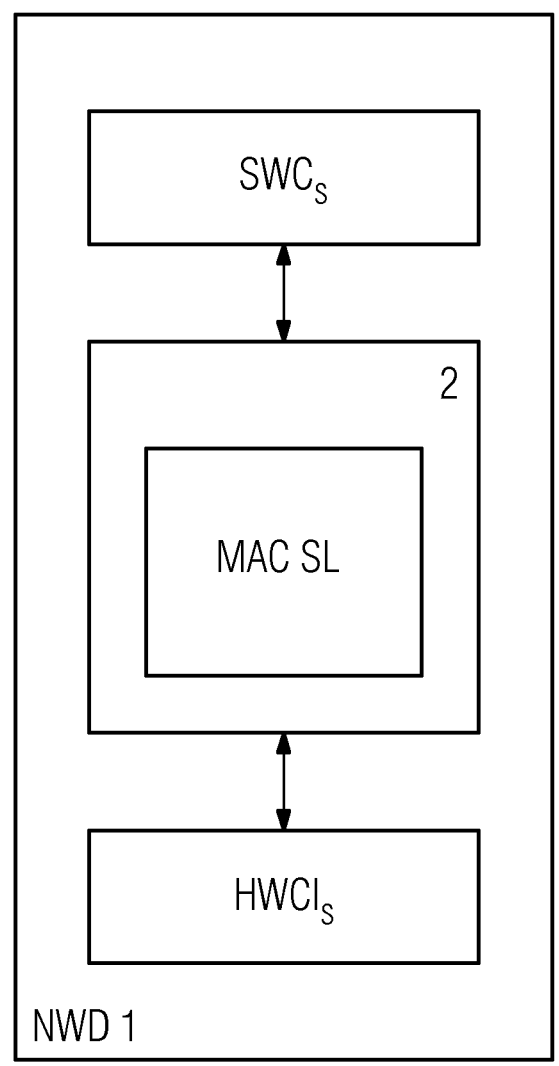
FIG. 1 shows a schematic diagram for illustrating the method and apparatus according to embodiments of the present invention.

As can be seen from the schematic diagram of FIG. 1, a network device 1 according to an aspect of embodiments of the present invention comprises an operating system OS which can be operated by a processing unit 2 of the network device 1. The operating system OS can for instance be implemented on a CPU of the network device 1. The operating system OS has an operating system kernel OSK implemented in a processor of the network device 1 and including a mandatory access control, MAC, mechanism adapted to control access to hardware component interfaces HWCIs of the network device 1 by one or more software components SWCs of the network device on the basis of a MAC security policy MAC-SP as illustrated in FIG. 1. The mandatory access control mechanism is implemented as part of the network device's operating system OS.

The operating system OS is in a possible embodiment a non-real time operating system. In a possible embodiment, the operating system OS is a Linux operating system, a Windows operating system, a macOS operating system, or OpenBSD. In a further possible embodiment, the operating system OS of the network device 1 implemented in the processing unit 2 can comprise a real time operating system (RTOS) such as VxWorks or FreeRTOS. The MAC security policy MAC-SP comprises access rights defined as access relations between software component security labels SWC-SL assigned to software component types and hardware component interface security labels HWCI-SL assigned to hardware component interfaces HWCIs. The network device 1 can comprise different hardware component interfaces HWCIs of different hardware component interface types. For instance, the hardware component interfaces HWCIs of the network device 1 can comprise IO interfaces, network interfaces, memory interfaces and/or configuration interfaces of the network device 1. The different hardware component interfaces HWCIs can be of the same or of different hardware component interface types. These hardware component interface types can comprise for instance a configuration type, a device intern type, a control network type or an open network type. In a possible embodiment, the software components SWC illustrated in FIG. 3 can comprise applications including control applications, device status applications, configuration applications and/or data validation applications. The software components SWC can form part of a so-called user space. Also, the software components can be of the same or of different software component types. These software component types can also be called software component domains. The software component types, or software component domains comprise in a possible exemplary embodiment a control network domain, an open network domain, a domain intern domain, a control domain, an external communication domain and/or a device intern cross domain.

An access to a hardware component interface HWCI requested by a software component SWC is permitted by a mandatory access control mechanism implemented as part of the network device's operating system OS run on the processing unit 2. The access is controlled on the basis of a MAC security policy MAC-SP comprising predefined access rights. These access rights are defined as access relations between software component security labels SWC-SL assigned to the different software component types and hardware component interface security labels HWCI-SL assigned to hardware component interface types. The access to a hardware component interface HWCI requested by a requesting software component SWC is permitted by the MAC mechanism to provide a non-reactive unidirectional dataflow in a possible embodiment. The access relations can in a possible implementation indicate different access types to access the respective hardware component interfaces HWCI by the software components SWC permitted according to the access rights of the MAC security policy MAC-SP. These access types of the access relations can comprise in a possible embodiment a read only, RO, access type, a write only, WO, access type, a read and write, RW, access type, a client mode access type and/or a server mode access type.

The MAC security policy MAC-SP can be stored in a possible embodiment in a file system of the network device 1 and can be loaded during booting of the network device's operating system OS. In an alternative embodiment, the MAC security policy MAC-SP can be compiled into the operating system kernel OSK of the device's operating system OS.

The network device 1 shown in the schematic diagram of FIG. 1 can in a possible embodiment be a programmable logic controller PLC. In an alternative embodiment, the network device 1 can also be an IoT gateway between two networks. In a still further possible embodiment, the network device 1 can also comprise a control device for controlling a machine within an industrial automation network.

Figure 2:
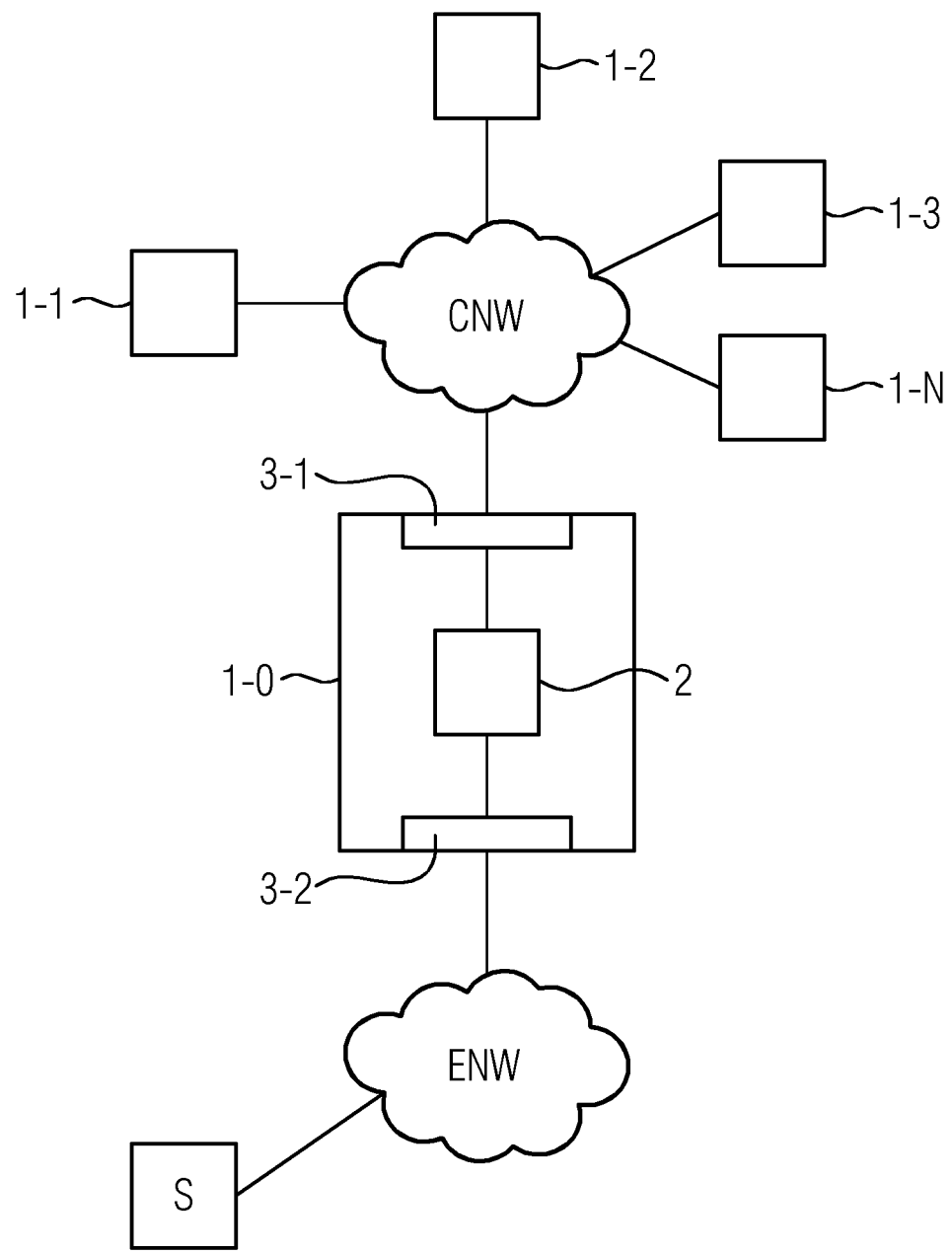
FIG. 2 shows a block diagram of a possible exemplary use case for implementing the method and apparatus according to embodiments of the present invention.

FIG. 2 shows an example of a network device 1 according to an aspect of embodiments of the present invention being located as a gateway between a control network CNW and an external network ENW. In the illustrated embodiment, the network device 1-0 comprises at least one internal network interface 3-1 connected to the internal control network CNW as shown in FIG. 2. The network device 1-0 further comprises at least one external network interface 3-2 connected to the external network ENW. The control network CNW can form part of an automation system which can comprise further network devices such as control devices or programmable logic controllers PLC. As shown in FIG. 2, the remaining network devices 1-1 to 1-n are all connected to the control network CNW connected to the gateway 1-0 by means of the first interface 3-1 of the gateway. In a possible embodiment, the method for providing restricted access to hardware component interfaces HWCIs of the network device is implemented in the gateway network device 1-0 of the system shown in FIG. 2. In a possible embodiment, the method for providing restricted access to hardware component interfaces HWCIs of a network device 1 can also be implemented in one or more of the remaining network devices 1-1 to 1-n connected to the control network CNW. The external network ENW can comprise a backend network such as a local area network LAN to which further entities or components can be connected. For example, a server S can be connected to the external network ENW for analyzing data generated by components of the control network CNW. This data is forwarded by the gateway network device 1-0 via its second network interface 3-2 and via the external network ENW to the analyzing server S. The dataflow of the data to be analyzed by the server S is unidirectional and non-reactive.

The hardware component interfaces HWCIs of the network devices 1 can comprise any kind of network interfaces, in particular wireless or wired interfaces. The hardware component interfaces HWCIs can comprise wired interfaces such as USB, serial UART interfaces or parallel data interfaces such as PCI interfaces. A further possible hardware component interface HWCI can comprise network ports, HDMI or Ethernet interfaces. The hardware component interfaces HWCIs can also comprise wireless interfaces, in particular Bluetooth interfaces, ZigBee interfaces or WLAN interfaces.

For the different hardware component interfaces HWCIs corresponding data structures exist in the operating system OS. The data structure can for instance indicate the name of the hardware component interface HWCI, an address of the hardware component interface HWCI, a status of the hardware component interface HWCI and signal levels. The data structure offered by the operating system OS allows to label the respective hardware component interface HWCI. The hardware component interface HWCI can be labeled with hardware component interface security labels HWCI-SL assigned to the hardware component interface type of the respective hardware component interface HWCI. The hardware component interface HWCI can comprise a network interface 3 as illustrated in the exemplary system of FIG. 2. Further, the hardware component interface HWCI can also comprise IO interfaces for actuators and/or sensors. The hardware component interface HWCI can also include memory interfaces, for instance, memory interfaces of a flash memory and/or of a configuration memory. The hardware component interfaces HWCIs can also include configuration interfaces of a network device 1.

The MAC security policy MAC-SP comprise access rights defined as access relations between software component security labels SWC-SL and hardware component interface security labels HWCI-SL assigned to the hardware component interface types. The access relations of the access rights can indicate different access types of the allowed access to the hardware component interface HWCI by different software components SWC. These access relations can be restrictive or less restrictive. For instance, the access relations can allow only a read only, RO, access to the hardware component interfaces HWCIs of a specific hardware component interface type. Further, the access types can in a possible embodiment allow a software component SWC of a specific software component type only to write, WO, to a hardware component interface HWCI of a specific hardware component interface type. A less restricted access type allows an access to a hardware component interface HWCI of a specific hardware component interface type by a software component SWC of a specific software component type so that the software component SWC can both perform a read and write operation, RW, on the respective hardware component interface HWCI. The access relations between software component interface types and hardware component interface types are also illustrated in the example shown in the schematic diagram of FIG. 4.

In the illustrated embodiment of FIG. 2, the network device 1 forms an IoT gateway which reads data from other network devices 1-1 to 1-n of the control network CNW, e.g. via OPC UA and forwards the data to the backend network ENW. Such an IoT gateway 1-0 can comprise different software components SWC providing, for instance, diagnostic functions, or forming a messaging agent for communication with the backend network ENW. Further, the IoT gateway 1-0 can comprise software components SWCs which are used for preprocessing raw data received from the other network devices 1-i of the control network CNW. This raw data processing can comprise, for instance, data compression or data pattern recognition. These different software components or applications can comprise applications which are installed on the network device 1 or which can be loaded by the network device 1.

The software components SWCs implemented on the respective network device such as the IoT gateway 1-0 shown in FIG. 2 are threatened by the fact that they can be attacked from the external network interface 3-2 and manipulated, for instance by using unpatched vulnerabilities in the operating system OS. Especially, software components SWCs which are used for communicating with the backend system or external network ENW can be the object of manipulations or attacks from abroad. Moreover, loadable applications or software components SWCs can comprise malfunctions. The method according to embodiments of the present invention increases the reliability of the network device 1 and increases its robustness against external attacks, in particular cyber-attacks. Even when there is an attack or a malfunction of a software component SWC implemented on the network device 1, an inadmissible influence of the safety-critical control network CNW or of a control function of the network device 1 is prevented. The method according to embodiments of the present invention can not only be used for the gateway network device 1-0 as illustrated in FIG. 2, but also for other network devices 1-i connected to the control network CNW. With the method according to embodiments of the present invention, by using operation system-based security functions such as SELinux, an unwanted influencing of the internal control network CNW or other components of the respective network device 1 by a software component SWC of the network device 1 not assigned with the respective function is prevented. The method according to embodiments of the present invention allows a software component specific filtering of the network communication and the restriction of admissible accesses to sensible components of the system such as the configuration memory or the hardware security module of the network device 1.

Hardware-based resources of the device or network device 1, in particular a network interface for connection with the control network CNW receive assigned security labels SL. Further, each software component SWC receives also assigned security labels SL. On the basis of a MAC security policy MAC-SP of a kernel-based MAC system it is defined depending on the assigned security labels SLs which software component security labels SWC-SL have access relations with which hardware component security labels HWC-SL. Accordingly, with the method of embodiments of the present invention, the kernel-based MAC security system can be used to restrict the access to hardware components HWC and/or hardware component interfaces HWCI of a device by different kinds of software components SWCs. The software components SWCs can be installed on the network device 1 or can be loaded by the network device 1 via an interface from another entity of the system.

An advantage of the method according to embodiments of the present invention resides in that it allows to restrict which software components SWCs have a reactive or non-reactive access to hardware components HWCs of the device. A read only, RO, access, for instance, is a non-reactive unidirectional access providing an unidirectional dataflow. In contrast, a read and write, RW, access does not provide for a non-reactive unidirectional dataflow. Even when the software component SWC comprises a malfunction or has been manipulated the non-reactive unidirectional dataflow defined e.g. by the read only access type makes sure that the affected software component SWC cannot influence negatively the components of the control network CNW.

A software component SWC which has only read only, RO, access to a hardware component interface HWCI of the network device 1 can be used to implement a data diode policy at a network interface. With the mechanism according to embodiments of the present invention, no complex special hardware is required to guarantee that specific software components SWCs operate non-reactively, i.e. cannot influence a specific control network CNW connected to the device or other external components such as sensors or actuators connected to the network device 1 via IO interfaces.

In a possible embodiment, the second external network interface 3-2 provided for connection with the external network ENW gets a second security label being different from a first security label assigned to the other network interface 3-1. It is possible to implement a security policy SP where the access to the external network interface 3-2 is defined by using predefined security labels. For instance, only specific software components SWCs such as processes or applications of a certain software component type get a security label SL which allows them to access specific external hardware component interfaces HWCIs such as the external hardware component interface 3-2 shown in FIG. 2.

In a possible embodiment, no software component SWC is allowed access to both security labels, i.e. the security label SL for accessing the internal network interface 3-1 and the security label SL for accessing the external network interface 3-2. This guarantees that no process or application gets access to the external network interface 3-2 and the internal network interface 3-1 simultaneously or at the same time.

In a further possible embodiment, a software component SWC can receive a specific security label SL which indicates that the software component SWC has neither access to an external nor to an internal network interface. However, such a software component SWC, i.e. a software component SWC of such a software component type, can be used by other software components SWCs as a data diode to realize a data traffic between first software components SWCs having access to the internal network interface 3-1 and second software components SWCs having access to the external network interface 3-2. Such a data diode software component SWCd having such a specific security label SL can in a possible embodiment monitor or check the dataflow between the two other software components linked via the diode software component SWCd. For instance, the diode software component SWCd can check the data format flowing from the first software component SWC having access to a first network interface and a second software component SWC having access to a second network interface. Further, the diode software component SWCd can check whether data values are within an admissible value range. In a possible embodiment, it is possible to specify the data according to their content using predefined rules. For instance, the data can be classified according to the type of the data (configuration data, program code, log data) or their security criticality (internal or confidential). Such classifications are also known as data loss prevention DLP.

In a still further possible embodiment, a security level SL is defined which can be assigned to a software component type such that a software component SWC of this software component type having this specific security label has access to an IO interface to which sensors or actuators can be connected. By means of an IO interface, for instance, a security gateway network device, can provide the values of tamper sensors or status signals such as self-test OK or VPN tunnel established. Any kind of sensors and actuators can be connected to the network device 1 via IO network interfaces. For instance, a communication bus or analog sensors and actuators can be connected to an IoT gateway network device 1.

In a possible embodiment, a network device 1 having at least two network interfaces does have access only to one of the two network interfaces under the control of the MAC security policy SP implemented as part of the network device's operating system OS.

In a possible embodiment, a loadable network application or a software component SWC of the network device 1 such as a Docker container or a RKT container can get a security label SL assigned during installation of the application or when starting the application. This security label SL can be in a possible embodiment a fixed label such that the application or software component SWC cannot directly access safety-critical system components. In a further possible embodiment, the security label SL can be determined depending on a signature or other information of the application. In this embodiment, some applications or software components SWCs can have access to an expanded set of device resources.

In a possible embodiment, the operating system OS is formed by a Linux operating system. The mandatory access control, MAC, security functionality of such a Linux operating system can be used in a possible embodiment as a platform for the method according to embodiments of the present invention and can be used for providing restricted access to a hardware component interface HWCI of the network device 1. The mandatory access control security functionality of such an operating system OS can be used to prevent the unwanted influencing of a safety-critical control network or control function by manipulated software components SWCs. Further, it can be achieved that only predetermined software components SWCs can transmit data to an open external network ENW such as the Internet or an office network or have access to critical hardware components of the apparatus.

This allows the use of new functions such as loadable apps or containers without jeopardizing the operation of a control network CNW. Further, it is possible to increase the security of embedded legacy systems where all processes run with root rights or with the same user recognition without having to modify the user access rights. With the method according to embodiments of the present invention, it is possible to define exactly which kind of software components SWCs of a network device 1 can have access to which kind of hardware components of the same network device 1. The method can be implemented on an existing system without requiring a special security hypervisor.

Figure 3:
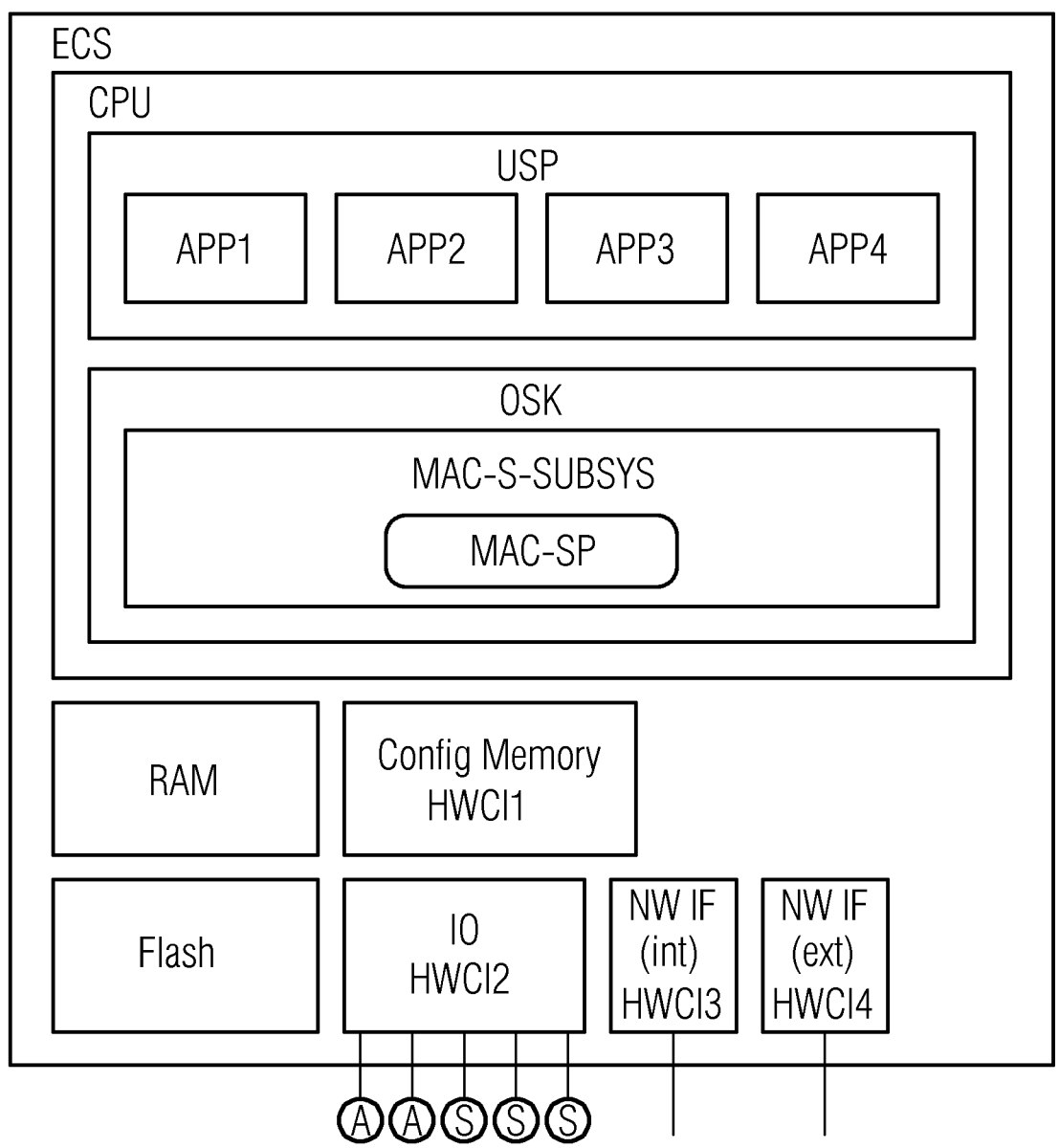
FIG. 3 shows a further schematic diagram for illustrating the method and apparatus according to embodiments of the present invention.

FIG. 3 shows a diagram for illustrating a possible exemplary embodiment of the method and apparatus according to embodiments of the present invention. FIG. 3 shows an embedded control system ECS having a processor or a CPU in which a user space USP and an operating system kernel OSK is implemented. The user space USP can comprise different kinds of software components SWCs, in particular processes or application programs. In the illustrated embodiment, the user space USP comprises four applications App1, App2, App3, App4. The first application App1 is for instance a control App. The second application App2 can be for example a backend device status application. The third App3 is for instance a cross domain data validation application. The fourth App4 can for instance comprise a device configuration web server. The operation system kernel OSK can be for instance a Linux kernel of a Linux operation system. This operating system kernel OSK comprises a MAC security subsystem MAC-S-SUBSYS such as SELinux. The MAC security subsystem MAC-S-SUBSYS comprises in the illustrated embodiment a MAC security policy MAC-SP used by the method according to embodiments of the present invention for providing restricted access to a hardware component interface HWCI of the embedded control system ECS. The embedded control system ECS comprises in the illustrated embodiment different kinds of hardware component interfaces HWCIs. In the illustrated embodiment, the embedded control system ECS comprises four different kinds of hardware component interfaces HWCIs. The embedded control system ECS comprises in the illustrated embodiment a first hardware component interface HWCI1 which can be formed by a configuration memory. The second hardware component interface HWCI2 is an IO interface which can be used for connecting actuators and/or sensors S. The third hardware component interface HWCI3 comprises an internal network interface. The fourth hardware component interface HWCI4 comprises for instance an external network interface. The embedded control system ECS can comprise further components such as a RAM memory and/or a flash memory. In a possible embodiment, the MAC security policy MAC-SP can be stored in a file system of the embedded control system ECS and can be loaded during booting of the operating system OS. In another possible embodiment, the MAC security policy MAC-SP can also be compiled into the operating system kernel OSK of the device's operating system OS. A code of the operating system kernel OSK can be for instance memorized in the flash memory.

In the illustrated embodiment of FIG. 3, the application software components SWC such as the illustrated applications can be executed in a user space USP. The CPU can for instance comprise a microcontroller of a system. The operation system kernel OSK comprises a function for a mandatory access control MAC, e.g. SELinux, SMACK or AppArmor. With the system according to embodiments of the present invention, the MAC security policy MAC-SP implemented in the MAC security subsystem of the operating system kernel OSK comprises access rights being defined as access relations between software component security labels SWC-SL and hardware component interface security labels HWCI-SL.

Figure 4:
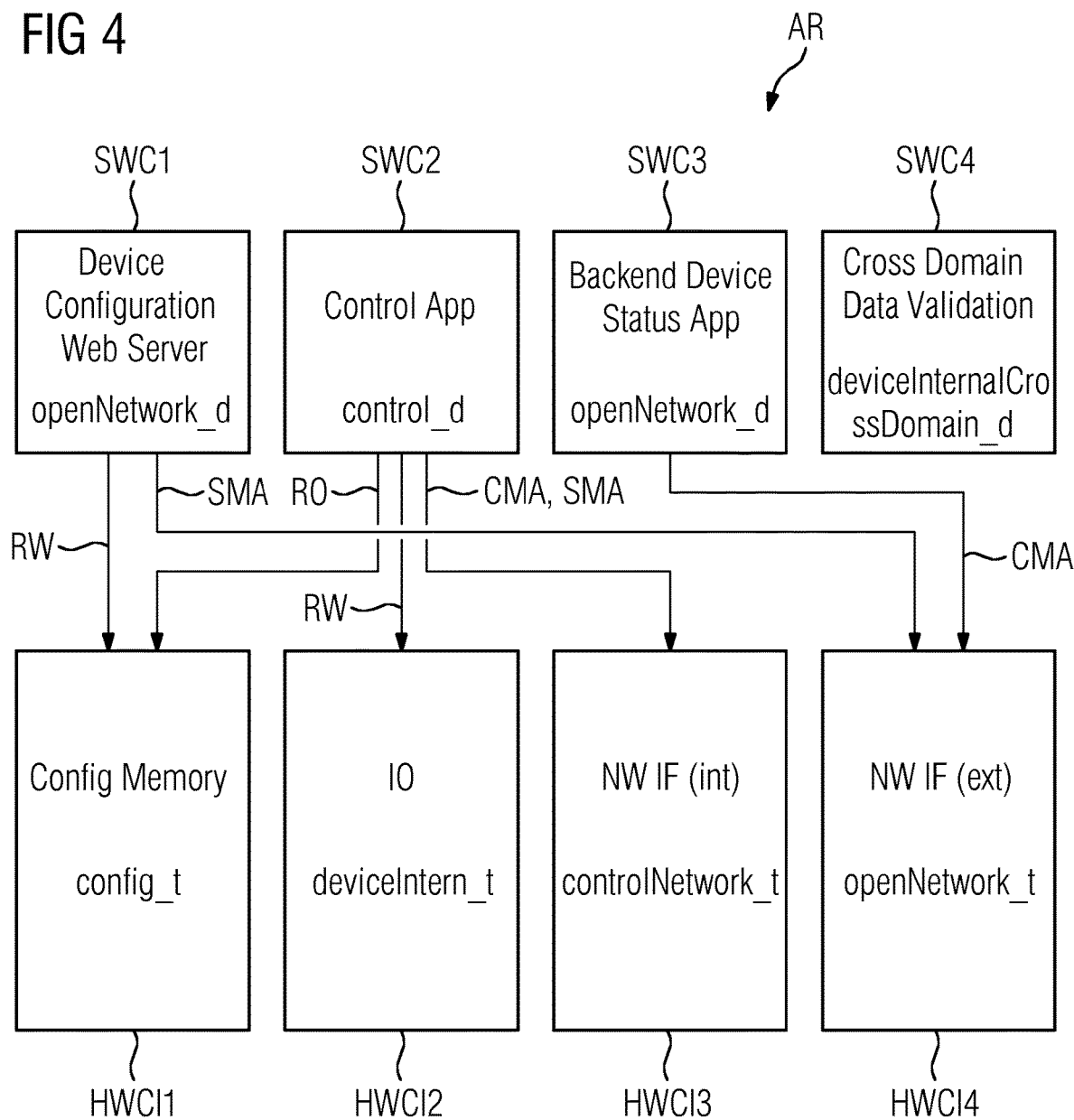
FIG. 4 shows a further diagram for illustrating a possible exemplary MAC security policy used by the method and apparatus according to embodiments of the present invention.

This is illustrated in the diagram of FIG. 4. As can be seen in FIG. 4, access rights are defined as access relations AR between software component security labels SWC-SL and hardware component interface security labels HWCI-SL. The software component security labels SWC-SL are assigned to software component types SWC-T and the hardware component interface security labels HWCI-SL are assigned to hardware component interface types HWCI-T. In the illustrated example, the software component security label "openNetwork d" is assigned to the software component type "Device Configuration Web Server". The second software component security level "control d" is assigned to the software component type controller application. The third software component security label "openNetwork d" is assigned to the software component type "Backend Device Status Application". The fourth software component security label "Device Internal Cross Domain d" is assigned to the software component type "Cross Domain Data Validation".

Further, the network device 1 comprises in the illustrated example of FIG. 4 hardware component interfaces HWCI of different hardware component interface types HWCI-T. Hardware component interface types HWCI-T can comprise for instance a configuration type, a device intern type, a control network type and the open network type, as shown in FIG. 4. A configuration memory of the network device 1 forms a hardware component interface HWCI of the configuration type. The IO interface of the network device 1 forms a hardware component interface HWCI of the hardware component interface type "Device Intern Type". The internal network interface comprises in the illustrated embodiment the hardware component interface type "Control Network". The external network interface has in the illustrated embodiment the hardware component interface type "Open Network Type". A software component SWC forming a Device Configuration Web Server having the software component security label "Open Network d" has access according to the access relation shown in FIG. 4 to an external network interface of the hardware component interface type "Control Network Type". In a possible embodiment, the access relation AR can also indicate the access type of the respective access. In the illustrated example of FIG. 4, the Device Configuration Web Server software component SWC1 has a server mode access SMA to the external network interface NWIF(ext) of the network device 1. This allows opening and listening on a server socket to which other nodes or network device can establish a connection. Further, it has RW access to the configuration memory.

The control App forming a second software component SWC2 of another type has a software component security label SWC-SL of the control network domain allowing a read only RO access to the configuration memory. Further, the control App SWC2 has a read and write access RW to the IO interface of the respective apparatus. Moreover, the control App SWC2 has access to the internal network interface NWIF(int) in a client and server mode access operation CMA, SMA. The backend device status application SWC3 has in the illustrated example a client mode access CMA to the external network interface NWIF(ext) of the apparatus. The client mode access CMA allows to establish a connection to an external server; however, no server socket can be opened.

The policy example shown in FIG. 4 is only exemplary. Different kinds of software component types SWC-T and/or hardware component interface types HWCI-T can be predetermined. The MAC security policy MAC-SP can be preconfigured and/or changed during operation of the system. The MAC security policy MAC-SP has access rights defined as access relations AR between the security labels SL as illustrated in FIG. 4 and can be changed depending on the use case. Accordingly, the MAC security policy allows a flexible reconfiguration of the system. The method for providing restricted access to hardware component interfaces HWCIs of a network device 1 allows to increase the security, safety and privacy of a system. It can be used to provide a non-reactive unidirectional dataflow between different components and/or networks. It allows to provide a non-reactive unidirectional dataflow on process level and not only on apparatus level.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for providing restricted access to hardware component interfaces of a network device by one or more software components of the network device, wherein an access to a hardware component interface requested by a software component is permitted by a mandatory access control, MAC, mechanism implemented as part of the network device's operating system on the basis of a MAC security policy comprising access rights defined as access relations between software component security labels assigned to software component types and hardware component interface security labels assigned to hardware component interface types,
    wherein the hardware component interfaces of the network device include at least one internal network interface to an internal control network and at least one external network interface to an external network,
    wherein a first security label is assigned to the at least one internal network interface, a second security label is assigned to the at least one external network interface, and the first security label and the second security label are different, and
    wherein no software component is allowed simultaneous access to both the first security label and the second security label.

2. The method according to claim 1, wherein the restricted access to a requested hardware component interface by a requesting software component permitted by the MAC mechanism provides a non-reactive unidirectional dataflow.

3. The method according to claim 1, wherein the access relations indicate access types of access to the hardware component interfaces by the software components permitted according to the access rights of the MAC security policy.

4. The method according to claim 3, wherein the access types of the access relations comprise:
    a read only, RO, access type,
    a write only, WO, access type,
    a read and write, RW, access type,
    a client mode access type, and
    a server mode access type.

5. The method according to claim 1, wherein the software components comprise applications including:
    control applications,
    real-time control applications,
    safety applications,
    device status applications,
    configuration applications and
    data validation applications.

6. The method according to claim 1, wherein the hardware component interfaces further comprise:
    IO interfaces,
    memory interfaces, and
    configuration interfaces.

7. The method according to claim 1, wherein the hardware component interface types comprise:
    a configuration type,
    a device intern type,
    a control network type,
    a real-time control type,
    a safety control type, and
    an open network type.

8. The method according to claim 1, wherein the software component, SWC, types comprise:
    a control network domain,
    an open network domain,
    a domain intern domain,
    a control domain,
    a real-time control domain,
    a safety control domain,
    an external communication domain and
    a device intern cross domain.

9. The method according to claim 1, wherein the MAC security policy is stored in a file system of the network device loaded during booting of the network device's operating system.

10. The method according to claim 1, wherein the MAC security policy is compiled into the operating system kernel of the device's operating system.

11. The method according to claim 1, wherein the operating system comprises a non-real time operating system or a real time operating system.

12. A network device with restricted access to its hardware component interfaces, the network device comprising:
    an operating system, OS, kernel implemented in a processor of the network device and including a mandatory access control, MAC, mechanism adapted to control access to the hardware component interfaces of the network device by one or more software components of the network device on the basis of a MAC security policy comprising access rights defined as access relations between software component security labels assigned to software component, SWC, types and hardware component interface security labels assigned to hardware component interface, HWCI, types,
    wherein the hardware component interfaces of the network device include at least one internal network interface to an internal control network and at least one external network interface to an external network,
    wherein a first security label is assigned to the at least one internal network interface, a second security label is assigned to the at least one external network interface, and the first security label and the second security label are different, and wherein no software component is allowed to access the first security label at the same time as the second security label.

13. The network device according to claim 12, wherein the hardware component interfaces of the network device comprise:

at least one of IO interfaces,
network interfaces,
memory interfaces and
configuration interfaces.

14. The network device according to claim 12, wherein the network device comprises:

a programmable logic controller, PLC,
an IoT gateway or
a control device.

\* \* \* \* \*